(12) United States Patent
Cadarette et al.

(10) Patent No.: US 12,498,032 B2
(45) Date of Patent: *Dec. 16, 2025

(54) LOW AXIAL RUNOUT DRIVEN PULLEY THROUGH THE APPLICATION OF A SPINDLE SHAFT UTILIZING MULTIPLE SETS OF BEARINGS WITH RADIAL CLEARANCE TO THE SHAFT

(71) Applicant: Gates Corporation, Denver, CO (US)

(72) Inventors: Marc Cadarette, Windsor (CA); Jason Jacques, Windsor (CA); Robert Masse, Windsor (CA); Michael Koppeser, Windsor (CA)

(73) Assignee: Gates Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/812,596

(22) Filed: Aug. 22, 2024

(65) Prior Publication Data
US 2024/0410460 A1 Dec. 12, 2024

Related U.S. Application Data

(62) Division of application No. 17/946,945, filed on Sep. 16, 2022, now Pat. No. 12,098,762.

(51) Int. Cl.
*F16H 55/36* (2006.01)
(52) U.S. Cl.
CPC .................................. *F16H 55/36* (2013.01)
(58) Field of Classification Search
CPC ............ F16H 55/36; F16D 3/12; F02B 77/00
See application file for complete search history.

(56) References Cited

U.S. PATENT DOCUMENTS

| | | | | |
|---|---|---|---|---|
| 4,832,674 A * | 5/1989 | Takemoto | ............... | G11B 15/18 403/368 |
| 4,838,841 A * | 6/1989 | Harvey | ................... | F16H 55/48 474/190 |
| 5,795,137 A * | 8/1998 | Ozawa | .................. | F04D 29/708 417/362 |
| 5,887,576 A * | 3/1999 | Wheeler, Jr. | ............ | F02B 39/04 415/124.2 |
| 2002/0183147 A1* | 12/2002 | Fujiwara | ............... | F16C 41/001 474/70 |
| 2003/0094849 A1* | 5/2003 | Joki | ...................... | F16C 35/063 301/105.1 |

(Continued)

*Primary Examiner* — Anna M Momper
*Assistant Examiner* — Mark K Buse
(74) *Attorney, Agent, or Firm* — Kevin J. Aiken, Esq.

(57) ABSTRACT

A low axial runout driven pulley through the application of a spindle shaft utilizing multiple sets of bearings with radial clearance to the shaft. Utilizing a belt-driven pulley supporting overhanging loads with low axial runout provided by a spindle shaft with radial clearance to supporting bearings. Further axial clamp loading may be provided through multiple sets of bearings by the application of a fastener, such as a shaft bolt and a sleeve that press against the inner races of the bearings in the axial direction with this clamp load. The belt-driven pulley with low axial runout through the application of a spindle shaft utilizing at least two sets of bearings with radial clearance to the shaft may be utilized with heavy-duty trucking, marine, industrial, and other systems that utilize an overhung driven component.

16 Claims, 5 Drawing Sheets

(56) References Cited

U.S. PATENT DOCUMENTS

| | | | | |
|---|---|---|---|---|
| 2005/0263127 A1* | 12/2005 | Pigott | ............... | F02B 67/06 |
| | | | | 123/198 C |
| 2006/0058105 A1* | 3/2006 | Evans | ............... | B29C 45/14311 |
| | | | | 464/181 |
| 2017/0356541 A1* | 12/2017 | Skrobowski | .......... | F16C 33/586 |
| 2018/0023679 A1* | 1/2018 | Basile | ............... | F16C 33/586 |
| | | | | 474/166 |
| 2019/0063507 A1* | 2/2019 | Serkh | ............... | F16D 7/022 |
| 2021/0293286 A1* | 9/2021 | Serkh | ............... | F16H 55/566 |

* cited by examiner

LOW AXIAL RUNOUT DRIVEN PULLEY THROUGH THE APPLICATION OF A SPINDLE SHAFT UTILIZING MULTIPLE SETS OF BEARINGS WITH RADIAL CLEARANCE TO THE SHAFT

CROSS-REFERENCE TO RELATED APPLICATIONS

This application claims priority to U.S. patent application Ser. No. 17/946,945, filed Sep. 16, 2022, the entirety of which is hereby incorporated by reference in its entirety.

BACKGROUND

The present invention relates to a low axial runout driven pulley through the application of a spindle shaft utilizing multiple sets of bearings with radial clearance to the shaft.

SUMMARY

The present disclosure is directed to a belt-driven pulley with low axial runout through the application of a spindle shaft utilizing at least two sets of bearings with radial clearance to the shaft such as for use with heavy-duty trucking, marine, industrial, and other systems that utilize an overhung driven component. Industries that use a belt often require the use of a belt pulley to drive accessory components such as but not limited to a mechanical fan.

In heavy-duty transport applications, mechanical fans are required to keep motors and surrounding components cool and to circulate air. This involves the application of a fan clutch which is often directly connected to fan blades on one end and is allowed to slip on the other end which is directly connected to a pulley. The slip is reduced or the clutch is fully engaged once a set engine or radiator temperature is reached. When the fan clutch is fully engaged, the fan at its perimeter is directly rotated by the driven pulley. The mechanics of this fan clutch result in a significant structure (sometimes 8 kg or more) that overhangs the pulley and has an inherent imbalance due to its size, which is required to mount the fan, provide a robust structure, and contain its internal mechanisms. At high speeds, this imbalance force of the clutch when added to the imbalance caused by the wobble of its mounting face assembly may be too much for the supporting casting and bearings to structurally sustain. As the clutch has an inherent imbalance due to its internals, the added imbalance of the pulley mounting and the fan may need to be minimized. In some scenarios, the most efficient method of mounting the fan clutch is directly to the pulley through the use of a nut that affixes to a threaded hub on the pulley. The imbalance due to clutch assembly on this hub is controlled by the axial runout of the adjacent face on the front of the pulley. The wobble of this face relative to its axis of rotation is called axial runout. Because this is the clutch nut seating face it is sometimes referred to as nut face run-out. Although primarily applied to mechanical fans low axial runout pulleys would also have an application to any mechanism that is seated on a driven pulley with significant weight and imbalance and overhang beyond the belt. In early generation fan bracket designs the clutch weight was lower and the axial runout requirement on the mounting surface was 0.085 mm. As newer more complex clutching mechanisms were applied at greater weight the mounting requirement was reduced to 0.035 mm. New generation clutch designs in some systems may require 0.025 mm or lower axial runout.

A belt driven pulley mounted to a bracket with rotation and loading supported by one or two sets of bearing raceways is known. When the pulley must additionally support a overhang load outside of the driver belt plane a secondary raceway is required as a single row of bearings may result in tilting between inner and outer raceways causing uneven contact of the balls or rollers and thus uneven grease film thickness and thus overheat failures. For economy with unsupported overhanging loads on pulley an integral bearing may be applied. With this, the inner shaft has inner raceway features machined directly on its outside diameter to accommodate two or more rows of bearings. At least one end of the shaft is directly pressed into a hub on the pulley. Normally this end also has the mounting feature of the fan. The Outer raceway is normally pressed into the surrounding mounting bracket. These cartridge bearings sometimes have a row of ball bearings and a row of roller bearings for precise motion and to sustain thrust loads. However, CN205089439U describes the use of biserial tapered roller bearings or two rows of conical bearing and a fan bracket axle and connects the fan directly to the pulley via a fan flange. In other applications the hub is mounted to the integral bearing shaft via a press fit and the outer race of the integral bearing is pressed into the mounting bracket. The problem with these designs is that the space between the raceways is limited by the bearing itself. It may not be economical to have the distance between the raceways be more than 70 mm due to the size of the bearings that would be required. Long bearing spans may result in further difficulties such as but not limited to ensuring a bearing of this size has proper lubrication of both raceways. In this instance, more than two bearings may be used to support a larger shaft.

However, a larger distance between the rows of supporting bearings may allow for a more precise axis of rotation enabling a lower axial runout. Additionally, press fitting a bearing on a shaft causes distortion of the surrounding fan mounting surface which is detrimental to the axial runout of the mounting feature. Assembling another feature to mount the fan which is separate from the shaft is another degree of freedom that increases the amount of axial runout. With lowered requirements on axial runout needed for mounting fan clutches machining the mounting face after assembly of the pulley has been applied by some manufacturers. This requires investment in expensive grinding systems and the chips generated could themselves be a source of high measured values for axial runout as they contaminate locating datums or damage the bearing. Sorting to lower values and allowing a higher reject rate is also possible but costly and potentially not sustainable for manufacturing throughput.

In some embodiments, of the present invention, this invention may apply two bearing sets with at least one set of a double row bearing. Therefore, applying three to four rows of raceways to support a bearing shaft. These bearings may have the outer races pressed into the support bracket. The distance between the two bearings is controlled via a sleeve which is compressed between the bearing inner races. Both the inner races and the spacer provide a clearance fit, a minimum of 0.005 mm diametral clearance, to a shaft that is not press fit to the bearings in order to allow hand assembly. The shaft itself may be precision ground with a seating face for the clutch nut maintained relative to the diameter of the spinning shaft at a very tight axial runout at the component level. As such, the clutch mounting face, the threaded hub, and the precision ground shaft features are in a single component thus not affected by assembly variation. This runout is not distorted by press fits or other mounted assemblies and the clutch fan mounts directly to this shaft. The outermost bearing resists fan thrust motion by staking the bracket material above its outer race or through the use of a clip. This shaft is retained by a flange which is clamped to the shaft by a screw and provide the clamp load between the inner races of the two bearing sets via the sleeve. The assembly of the flange via the screw provides even clamping during assembly providing the best resulting axial runout.

A potential benefit of the present invention is that it may allow for very low axial runout at the assembly level for unsupported overhanging components that mount to the pulley and may have high imbalance, such as but not limited to a cooling fan. The use of more than two bearing raceways may ideally provide support for high loading and a more precise axis of rotation. In some embodiments, the distance between the two bearing sets may be increased through the use of the spacer which provides a clamping to the two inner races of the bearing sets. The unsupported overhanging mechanism (fan clutch or other) may be mounted directly to the shaft which is held tightly for axial runout at the component level and is not affected by subsequent press-fits or intermediate components in the assembly. In the preferred embodiment, there may also be no need for machining the mounting face after assembly which may add cost and potentially introduce cutting fluids that could contaminate the bearing grease and machining chips that could damage the seals of the bearings.

In applications that require significant convection to cool, large fans may be mounted directly to a belt-driven pulley. This fan may be able to be unsupported as long as the bearing design is robust and the mounting feature has low axial runout relative to the pulley axis of rotation. The present invention may also allow for the use of standardized bearing assemblies instead of designing a new integrated bearing for each new application. The present invention may be able to be held to a micron tolerance level axial runout for mounting the fan.

Additionally, there is potential to apply this invention to non-ICE motor cooling or industrial applications which require significant convection to cool the surrounding environment of the application. This invention also reduces scrap over today's current method of assembling components to an integrated bearing with no machining to qualify the mounting surface or overcome distortion due to the press fit of these assemblies.

Additionally or alternately, In some embodiments a low axial runout driven pulley system may further include a mounting bracket; a first bearing assembly seated in the mounting bracket; a second bearing assembly seated in the mounting bracket; a sleeve positioned between the first bearing assembly and the second bearing assembly; a shaft rotatably positioned between the first bearing assembly and the second bearing assembly; a clamping flange with a shaft bolt, wherein the clamping flange is configured and arranged to axially secure the shaft to the second bearing assembly; and a pulley secured to the shaft.

In another embodiment, a low axial runout driven pulley system may include a mounting bracket; a first bearing assembly seated in the mounting bracket to a first shelf hard stop; a second bearing assembly seated in the mounting bracket; a sleeve positioned between the first bearing assembly and the second bearing assembly; a shaft rotatably positioned between the first bearing assembly and the second bearing assembly, the shaft having a machined shaft diameter, a machined mounting face, and a threaded hub; a clamping flange with a shaft bolt, wherein the clamping flange is configured and arranged to axially secure the shaft to the second bearing assembly; an upper dust shield configured to limit contamination of the first bearing assembly; and a pulley secured to the shaft at the machined mounting face utilizing pulley mounting bolts. Other embodiments are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
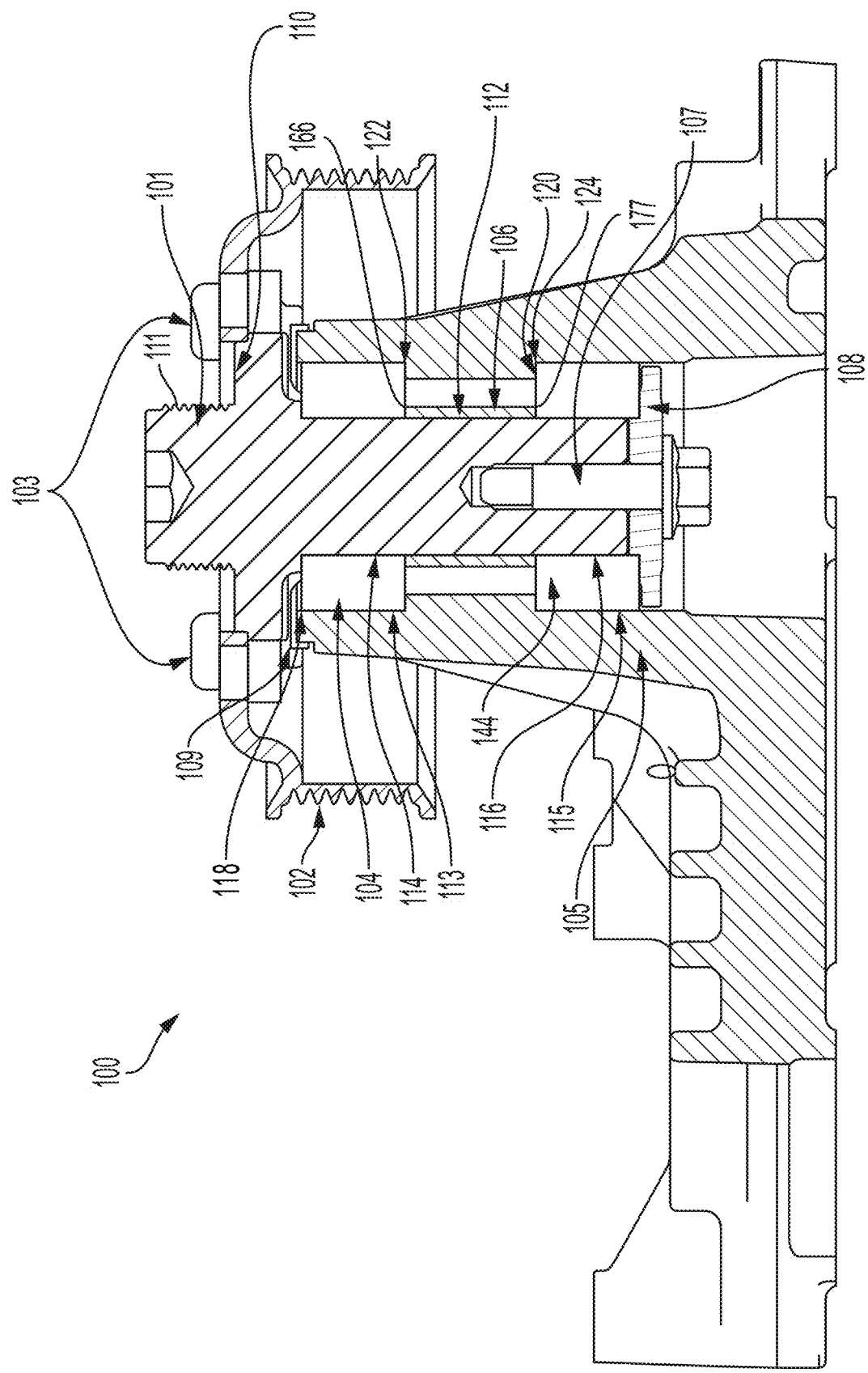
FIG. 1 is an exemplary illustration of a cross-section of a low axial runout driven pulley through the application of a spindle shaft utilizing multiple sets of bearings with radial clearance to the shaft.

As described above, described herein is a low axial runout driven pulley through the application of a spindle shaft utilizing multiple sets of bearings with radial clearance to the shaft.

In the following description, reference is made to the accompanying drawing that forms a part hereof and in which is shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 is an exemplary illustration of a cross-section of a low axial runout driven pulley through the application of a spindle shaft utilizing multiple sets of bearings with radial clearance to the shaft. FIG. 1 shows a low axial runout driven pulley system 100 according to this disclosure. In some embodiments, the low axial runout driven pulley system 100 may include but is not limited to a mounting bracket 105, a first bearing assembly 104, a second bearing assembly 144, a sleeve 106, a shaft bolt 107, a clamping flange 108, a shelf clearance 120, and a shaft 101. In some embodiments, it may also be beneficial to include a first shelf hard stop 122 and a second shelf hard stop 124, an upper dust shield 109, and a bearing retention system 118. In some embodiments, the mounting bracket 105 may be cast from steel, aluminum alloy, magnesium alloy, or the like. In other embodiments, the mounting bracket may be manufactured through industrial origami, folding sheet or plate, and joining the corners through adhesive, welding, joining tabs, or the like. A first shelf hard stop 122 and a second shelf hard stop 124 may be a feature molded or designed into the mounting bracket 105. A first shelf hard stop 122 and a second shelf hard stop 124 may also be machined into the mounting bracket 105 to ensure proper fitment of the first and second bearing assemblies. In some embodiments, an interference fit between the mounting bracket 105 and first and second bearing assemblies 104, 144 may be utilized and in others, a clearance fit may be utilized.

In some embodiments, the shaft 101 may contain a mounting face that is precision machined or ground relative to a precision machined or ground shaft diameter. In some embodiments the shaft 101 may also include features, such as but not limited to, threaded holes, through holes, locking features, mounting arms, or the like, to mount a belt pulley 102 via mounting bolts 103 or other through other attachment methods or to accept a shaft bolt 107. This may be beneficial so that press fits are not required for mounting a driven component, such as but not limited to a pulley, which may potentially distort the mounting face leading to an increase in axial runout. In some embodiments, the shaft may also incorporate a threaded hub 111 which may be machined relative to the shaft diameter in order to mount an overhanging accessory such as a fan clutch, propeller, fan, pulley, or the like. The axial runout and therefore the amount of wobble of this accessory may be controlled by the mounting face 110 of this shaft relative to the axis of rotation after clamping the accessory to a defined torque. In some embodiments, it may be beneficial to machine the mounting face relative to the shaft diameter 112. The shaft diameter 112 may be machined or ground to help achieve low axial runout. These surfaces may also be ground or surface prepared to provide low levels of axial runout for the entire low axial runout driven pulley system 100.

In some embodiments, the overhanging accessory may be supported by a first bearing assembly 104 and a second bearing assembly 144 with at least one of these assemblies containing either two raceways of ball bearings or ball and needle bearings contained within the two raceways. Shaft 101 may be designed so that there is a clearance to the bearing inner races, utilizing a clearance fit. Either the first or second bearing assembly may be pressed on its outer diameter into the mounting bracket 105 to a first shelf hard stop 122 within the mounting bracket 105. It may be beneficial to utilize an interference fit on the outer races of both the first and second bearing assemblies relative to the mounting bracket. However, in some embodiments, it may be beneficial to seat the first and second bearing assemblies 104, 144 into the mounting bracket 105 with a clearance or transition fit so that there is no distortion in the bearing from an interference or press fit. In this embodiment to secure the bearing, the bearing retention system 118 may be designed so that the outer race of the first and second bearing assemblies 113, 115 do not rotate in their position which may cause premature wear or degradation of the rolling elements. In some embodiments, it may also be beneficial to utilize a clearance or transition fit so the low axial runout driven pulley system 100 may be assembled and disassembled by hand, without the use of a press or specialized tool. In some embodiments, a sleeve 106 with clearance to the shaft 101 may be assembled so that the first and second ends of the sleeve rest 166, 177 on the inner race of the first bearing 114 and the inner race of the second bearing 116. In some embodiments, it may be beneficial to utilize a shelf clearance 120 between the outer race of the first bearing 113 and the outer race of the second bearing 115 assemblies in the fore-aft (in line with a first end of the sleeve 166 and second end of the sleeve 177) direction to ensure clamping is done through the sleeve 106 as opposed to through the rolling elements of the first and second bearing assembly. A clamping flange 108 that in some embodiments may also act as a dust shield may be located also on the inner race of the lower bearing and a clamp load is applied via a shaft bolt 107 so that the clamping force is applied between both bearing inner raceways 114, 116 and the sleeve via the shaft bolt 107 and clamping flange 108. In some embodiments, an upper dust shield 109 can also be applied to further protect the first and second bearing assemblies from contamination, which may be likely blown into the bearing in this type of environment due to the large fan which is commonly applied to the end of the shaft 101. In some embodiments, the bearing assembly closest to the pulley may be constrained by a bearing retention system 118. In some embodiments a bearing retention system may include but is not limited to a staked first bearing assembly, a design utilizing at least one pin, or a clip, a threaded retainer, a retaining ring (such as a circlip) or a bolted retainer plate to ensure there is limited (+/−0.01-0.005 mm) to no forward or rearward (in line with the axial direction of the shaft) motion of the bearing assemblies due to thrust forces. In some embodiments, a first shelf hard stop 122 and a second shelf hard stop 124 may be present as a safety feature or as an ease of assembly feature. Under a sudden axial force, the first shelf hard stop 122 and a second shelf hard stop 124 may prevent a catastrophic failure.

Figure 2:
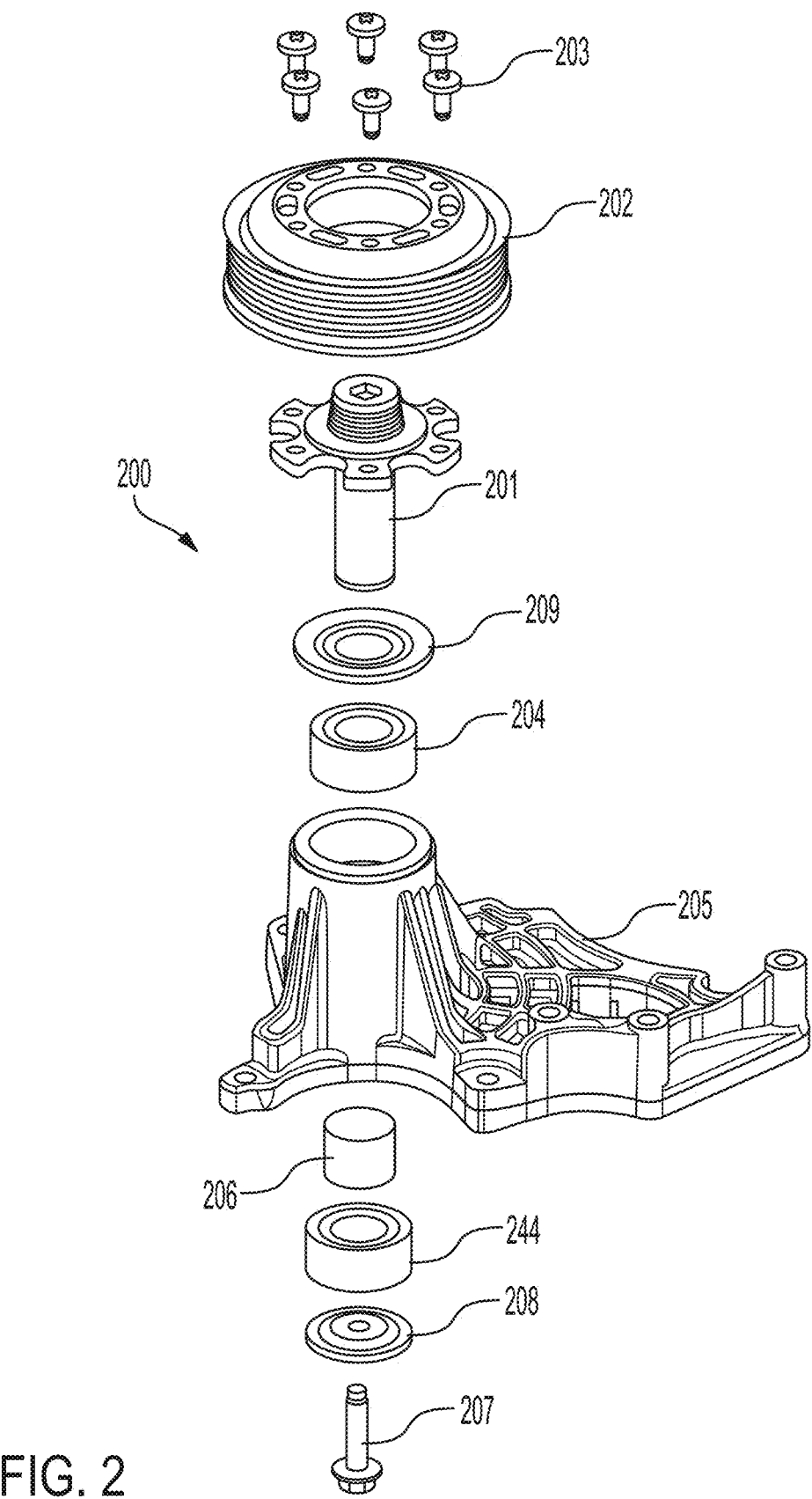
FIG. 2 is an exemplary embodiment of an exploded view of a low axial runout driven pulley.

FIG. 2 is an exemplary embodiment of an exploded view of a low axial runout driven pulley. In some embodiments a low axial runout driven pulley system 200 it may be beneficial to include a pulley 202, pulley mounting bolts 203, a shaft 201, an upper dust shield 209, a first bearing assembly 204, a second bearing assembly 244, a mounting bracket 205, a sleeve 206, a clamping flange 208, a shaft bolt 207, and the like. In some embodiments a low axial runout driven pulley system 200 may further include a mounting bracket 205; a first bearing assembly 204 seated in the mounting bracket 205; a second bearing assembly 244 seated in the mounting bracket; a sleeve 206 positioned between the first bearing assembly and the second bearing assembly; a shaft 201 radially clamped between the first bearing assembly 204, the sleeve 206, and the second bearing assembly 244; a clamping flange 208 with a shaft bolt 207, wherein the clamping flange is configured and arranged to axially secure the shaft to the second bearing assembly; and a pulley 202 secured to the shaft. In other embodiments, it may be beneficial to further include a shelf clearance (shown in FIG. 1. as 120) between the second shelf hard stop and the second bearing assembly. This may be beneficial to ensure that all clamping forces are being transmitted through the inner bearing race (shown in FIG. 1. as 114 and 116) of the first and second bearing assemblies and the sleeve. The first and second bearing assemblies may be any type of bearing that facilitates rotation of the shaft, which may include a roller bearing, needle bearing, ball bearings, or the like. In some embodiments, it may be beneficial to further include a bearing retention system (shown in FIG. 1. 118) for the first bearing assembly 204. This may include retaining the bearing by utilizing a staked first bearing assembly for the first bearing assembly 204. Another possible bearing retention system may include the use of a retaining ring, c-clip, retaining pins, or the like.

In some embodiments, it may be beneficial that the sleeve 206 contacts the inner race of the first bearing assembly (shown in FIG. 1 as 114) at a sleeve first end (shown in FIG. 1 as 166) and the inner race of the second bearing assembly (shown in FIG. 1 as 116) at a sleeve second end (shown in FIG. 1 as 177). This may be so that the clamping force provided by the shaft bolt 207 and the clamping flange 208 only be transferred through the inner race of the bearing and the sleeve and not the rolling elements, which may cause damage, wear, or premature failure of the bearing rolling elements. In some embodiments, it may be beneficial for the shaft bolt 207 to provide an axial compressive force capable of clamping the inner race of the first bearing assembly, the sleeve 206, and the inner race of the second bearing assembly so the inner race of the first bearing assembly, the sleeve, and the inner race of the second bearing assembly rotate simultaneously or spin together. In some embodiments, the axial compressive force from the shaft bolt engaging with internal threads of the shaft may provide a clamping force configured to engage the inner race of the first bearing assembly, the sleeve 206, the inner race of the second bearing assembly, the shaft 201, and the clamping flange 208 to rotate to as one assembly.

In some embodiments, it may be beneficial to install the first bearing assembly 204 to a first hard stop in the mounting bracket 205, so the edge of the first hard stop contacts the outer race (shown in FIG. 1. as 113) of the first bearing to ensure there is no rotation of the outer race in the mounting bracket. This may be beneficial in that the hard stop will not contact the rolling elements of the bearing and there may be a decreased chance of bearing rotation in the mounting bracket 205. In some embodiments, it may be beneficial to press fit the outer race of the first and second bearing assemblies 204, 244 into the mounting bracket 205 to ensure there is no rotation of the outer races.

In some embodiments where a large overhung mass is supported from the end of the shaft, such as a fan clutch, a fan, a propeller, or the like it may be beneficial to include a threaded hub on the shaft to accept these overhung components. The threads on the threaded hub may be either internal or external type threads to accompany varying overhung components. In some embodiments, in order to facilitate hand assembly and prevent damage from press fitting bearing assemblies onto the shaft 201, it may be beneficial to include a radial clearance fit between the first and second bearing assemblies and the shaft. This may be beneficial to prevent distortion of the shaft 201 from a press fit of assemble the first and second bearing assemblies and thereby retain a low axial runout shaft by utilizing a radial clearance fit to assemble the first and second bearing assemblies 204, 244, sleeve 206, and shaft 201 by hand. In some embodiments, this radial clearance fit may be a minimum of 0.0025 mm radial clearance or 0.005 diametral clearance. In some embodiments, the shaft may be radially clamped between the first bearing assembly 204, the sleeve 206, and the second bearing assembly 244. In some embodiments, this may be accomplished with a radial clearance fit but providing enough of a clamping or holding force to reduce the amount of radial slop or movement in the assembly. This may be accomplished through the use of a radial clearance fit to assemble the first and second bearing assemblies 204, 244, sleeve 206, and shaft 201. In some embodiments, this radial clearance fit may be a minimum of 0.0025 mm radial clearance or 0.005 diametral clearance. In some embodiments, this radial clearance fit provides enough of a frictional engagement so that the first bearing assembly (the inner race of the first bearing assembly), the sleeve, the second bearing assembly (the inner race of the second bearing assembly), and the shaft 201 rotate simultaneously or together in the mounting bracket 205. In some embodiments, this may be further aided through the axial clamping force provided by the shaft bolt 207 and clamping flange 208. In some embodiments, it may also be beneficial to have the first and second bearing be serviceable components and have the ability to be removable. It may be beneficial that the bearings are removable by hand or through the use of light pressing without damaging the surrounding mounting bracket so a replacement set of bearings may be placed in their place without any reduction in the strength of the mounting bracket 205. Having the first and second bearing assemblies 204, 244 be removable may also allow for easier assembly and for the potential for a low axial runout driven pulley system to be a serviceable component.

To further facilitate low axial runout, the shaft 201, in some embodiments, may include a shaft having a shaft diameter and a mounting face where the mounting face is a machined face relative to the machined shaft diameter. The shaft diameter and mounting face may be machined, ground, or prepared in any other way to provide perpendicular or near perpendicular surfaces. In some embodiments, the shaft may also include internal threads to accept and engage the shaft bolt. In some embodiments, the shaft bolt 207 may be a threaded bolt or may be a type of locking pin utilizing a locking design, pushpin style retention system, a ball locking pin, a spring locking pin, or the like. The shaft 201 may be designed to accept and engage any of these types of retention and locking systems to secure the shaft bolt 201 and clamping flange.

In order to increase service life and minimize maintenance, it may be beneficial to limit the amount of contamination such as dust, water, oil, and other particulates that enter into the mounting bracket 205 and bearing housing. In some embodiments, it may be beneficial to include an upper dust shield 209 configured to limit contamination of the first bearing assembly. An upper dust shield 209 may be a polymer, metal, alloy, composite, or the like shield that snaps or is secured in place through the use of a retaining ring, screw, or the like that covers or protects the first bearing assembly from contamination. It may also disrupt or stop contamination from getting into the bearing housing of the support bracket. This may further prolong the life of the low axial runout driven pulley system 200. In other embodiments where the mounting bracket 205 is not sealed, it may be beneficial to include a lower dust shield configured to limit contamination of the second bearing assembly. In some embodiments, the clamping flange 208 may function as the lower dust shield. The lower dust shield may be a polymer, metal, alloy, composite, or the like shield to limit contamination and provide sufficient clamping force. In some embodiments, the pulley 202 may be made as a single component or may be multiple components secured together, through adhesives, screws, bolts, or the like. The pulley 202 may be made from a polymer, metal alloy, composite, or the like material. In some embodiments, the pulley 202 may need to be secured to the shaft. This may be accomplished by utilizing pulley mounting bolts 203 or screws, through design by creating locking tabs, or through a press fit. In some embodiments, the pulley 202 may be overmolded on to the shaft. In some embodiments, it may also be beneficial to overmold the pulley 202 to the shaft 201 by injection molding a polymer or composite pulley onto a metal shaft. This may be done if the pulley 202 is made of polymer or composite materials used for the pulley. In some embodiments, it may also be feasible to overmold through diecasting or like process, an aluminum alloy or the like material pulley to a steel shaft or other metal alloy shaft. Different embodiments may use different material pulleys. In other embodiments, it may be beneficial to press fit the pulley 202 onto the shaft 201. This may be accomplished by heating the pulley 202 or cooling the shaft 201 and then forcing the components together through the use of a hydraulic press, clamp, fixture, or the like.

In some embodiments a low axial runout driven pulley system 200 may include a mounting bracket 205; a first bearing assembly 204 seated in the mounting bracket 205 to a first shelf hard stop; a second bearing assembly 244 seated in the mounting bracket 205; a sleeve 206 positioned between the first bearing assembly 204 and the second bearing assembly 244; a shaft 201 rotatably positioned between the first bearing assembly 204 and the second bearing assembly 244, having a radial clearance to the first bearing assembly 204 and the second bearing assembly 244, the shaft 201 having a machined shaft diameter, a machined mounting face, and a threaded hub; a clamping flange 208 with a shaft bolt 207, wherein the clamping flange 208 is configured and arranged to axially secure the shaft 201 to the second bearing assembly 244; an upper dust shield 209 configured to limit contamination of the first bearing assembly 204; and a pulley 202 secured to the shaft 201 at the machined mounting face utilizing pulley mounting bolts 203. Some embodiments may use more than two groups of bearing assemblies to support the shaft. For longer shafts, three or more bearings may be required to support the shaft, however, if the bearings are properly sized two bearings may be sufficient in some embodiments.

Figure 3:
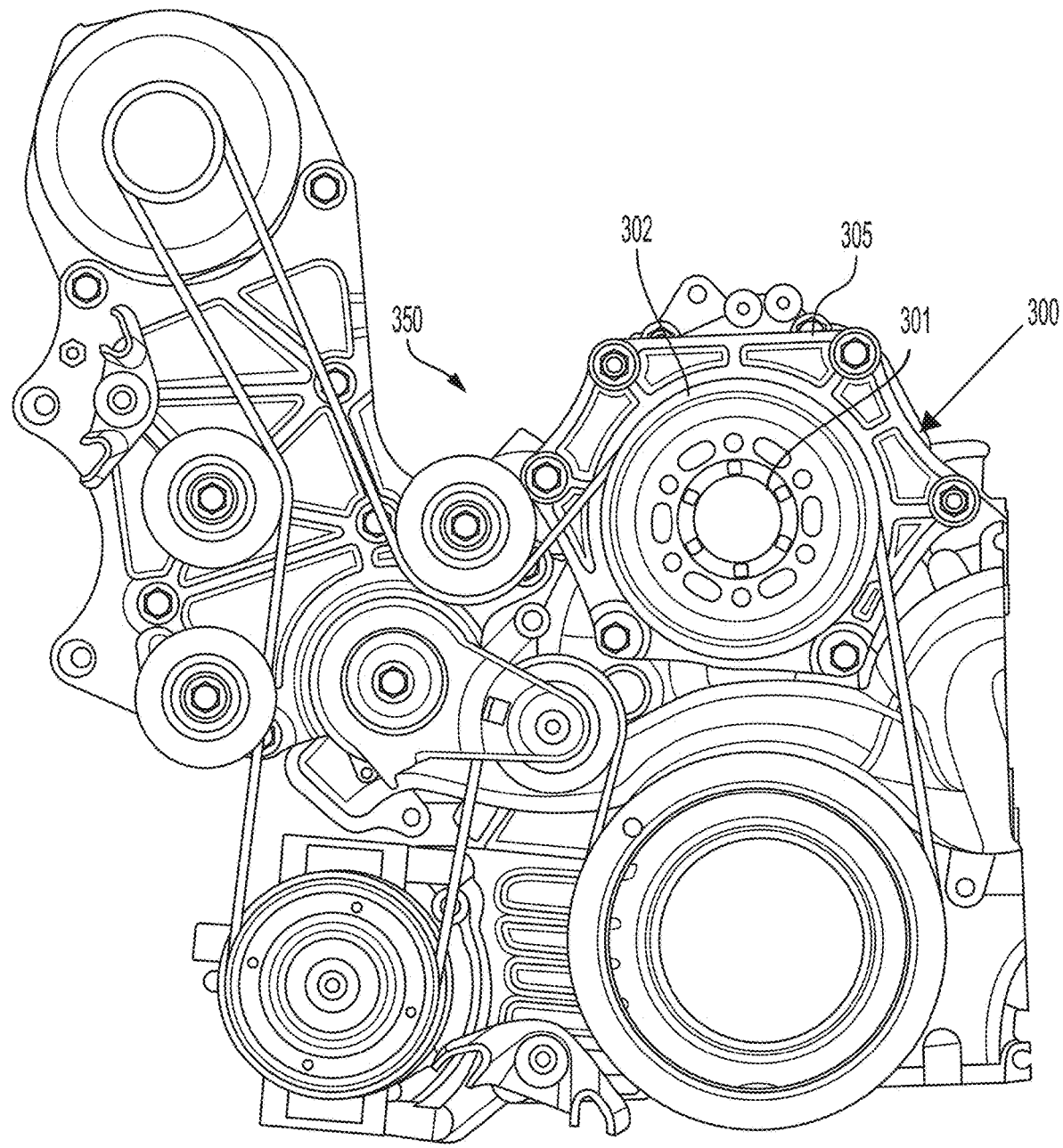
FIG. 3 is an exemplary embodiment of a low axial runout driven pulley mounted to a conventional internal combustion engine having a belt drive system.

FIG. 3 is an exemplary embodiment of a low axial runout driven pulley mounted to a conventional internal combustion engine having a belt drive system 350. In some embodiments, it may be beneficial to include a belt drive system 350 to drive the low axial runout driven pulley system 300. In some embodiments, this may be a conventional internal combustion engine where the belt drive system 350 is driven from the crankshaft. In other embodiments a belt drive system 350 may be present on a hybrid or electric motor where the belt drive system 350 is driven from an electric motor. The belt drive system 350 may directly drive the pulley 302 on the low axial runout driven pulley system 300 from the crank or electric motor or it may be driven off a secondary belt system. The shaft 301 may have the ability to carry an overhung mass such as a fan clutch, cooling fan, or secondary pulley for an AC (air conditioning) compressor or the like. The shaft 301 may have a threaded hub that includes either internal or external threads to accept the overhung component. The mounting bracket 305 is configured to support the remaining components of the low axial runout driven pulley system 300 and to further attach the system to the internal combustion engine, hybrid motor, or electric motor. The mounting bracket 305 may be manufactured by utilizing cast metal, composite, polymer, or other material. Additional manufacturing methods such as industrial origami and the like may be utilized.

Figure 4:
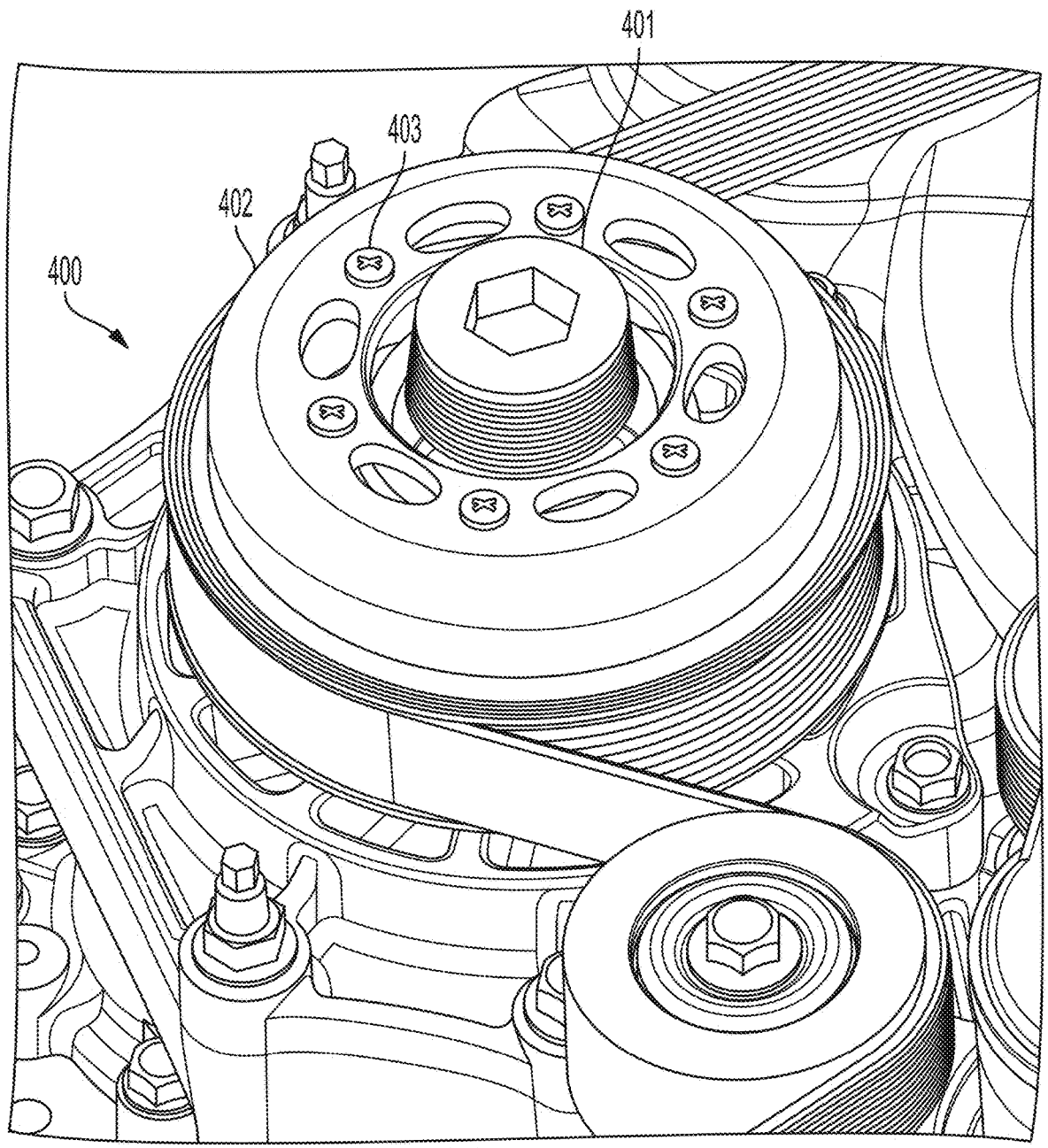
FIG. 4 is an exemplary embodiment of a detailed view of a low axial runout driven pulley system.

FIG. 4 is an exemplary embodiment of a detailed view of a low axial runout driven pulley system 400. In some embodiments, it may be beneficial to include a pulley 402 with pulley mounting bolt 403 that mount to the shaft 401. In some embodiments, it may be beneficial to further facilitate low axial runout, the shaft 40 may have a shaft diameter and a mounting face where the mounting face is a machined face relative to the machined shaft diameter. The shaft diameter and mounting face may be machined, ground, or prepared in any other way to provide perpendicular, near perpendicular surfaces, or another designed for angular relationship. In other embodiments, varying securing methods may be used to secure the pulley 402 to the shaft 401. The pulley 402 and shaft 401 may be designed to interlock with each other providing a secure attachment. In other embodiments, the pulley 402 may be press fit onto the shaft 401 through the use of an interference fit. Possible benefits of utilizing a machined face and machined shaft diameter may include the present invention being easier to assemble and disassemble, thereby introducing the possibility that the present invention could be a serviceable part creating less resource waste and energy consumption from recycling, new manufacture, and new part delivery logistics. Utilizing a clearance between the shaft 401 and first and second bearing assemblies may allow for easier assembly and disassembly and prevent distortion of the shaft from press fitting. Machining the shaft diameter would ensure that the tolerances for a clearance fit could be met continually while maintaining an assembly with low axial runout. The present invention could also be used in an application with a large driven shaft with an overhung mass. There may also be no need for costly tooling to machine faces after assembly is complete which may help to ensure there is no contamination from cutting fluid or machine chip that could be introduced into the bearing assemblies.

Figure 5:
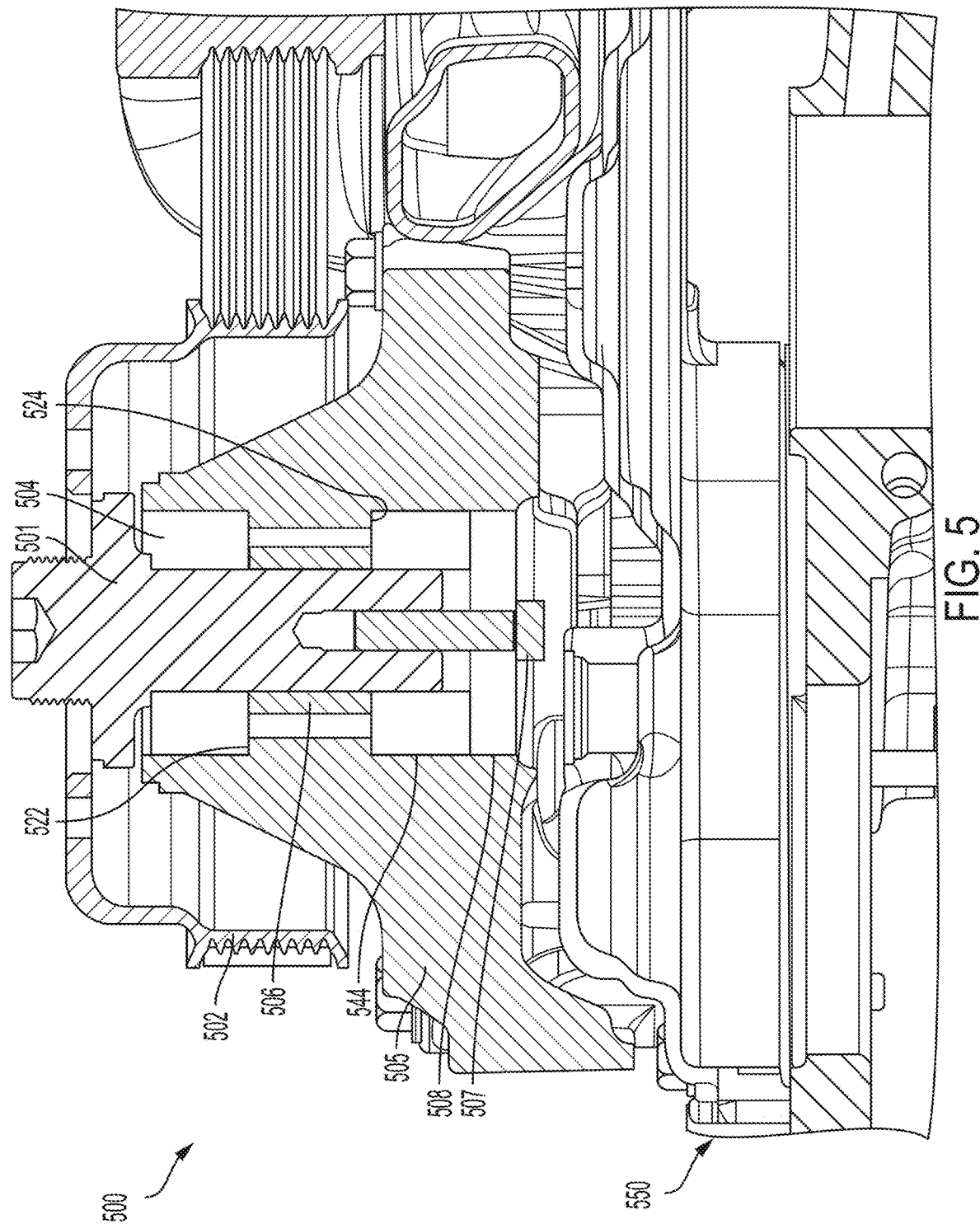
FIG. 5 is another exemplary embodiment of a cross-section of a low axial runout driven pulley through the application of a spindle shaft utilizing multiple sets of bearings with radial clearance to the shaft on a belt-driven system.

FIG. 5 is another exemplary embodiment of a cross-section of a low axial runout driven pulley 500 through the application of a spindle shaft utilizing multiple sets of bearings with radial clearance to the shaft on a belt drive system 550. The invention consists of a shaft 501 which contains a mounting face 510 that is precision machined or ground relative to a shaft diameter (shown in FIG. 1 as 112) that may be precision machined or ground. The shaft 501 may also has features to mount a pulley 502 via mounting bolts (shown in FIG. 1) as 103 so that no press fits are incorporated that could potentially distort the mounting face at a micron level. However, in some embodiments, it may be beneficial to utilize a press fit or interference fit pulley and in other embodiments, it may be beneficial to overmold the pulley 502 on to the shaft 501. The shaft 501 also incorporates a threaded hub 511 feature which is precision machined relative to the shaft diameter 512 in order to mount an overhanging accessory such as a fan clutch. The wobble of this accessory is controlled by the mounting face (shown in FIG. 1 as 110) of the shaft relative to the axis of rotation after clamping the accessory to a defined torque. The overhanging load may be supported by a first and second bearing assembly 504, 544 with at least one of these assemblies containing either two raceways of ball bearings or ball and needle bearings contained within the two raceways. The shaft 501 may be designed so that there will always be clearance to the innermost diameter of the bearings (the inner races, shown in FIG. 1 as 114 and 116). In some embodiments, the first bearing assembly 504 may be pressed on its outer diameter into a mounting bracket 505 to a first shelf hard stop 522 within the bracket. In some embodiments there may be a shelf clearance between the second bearing assembly 544 and the second shelf hard stop 524. In some embodiments, there may be an interference fit on the outer raceway of both bearing assemblies relative to the mounting bracket. A sleeve 506 that is designed with clearance to the shaft may be assembled so that its ends rest on the inner races of both the first and second bearing assemblies. In some embodiments, it may be beneficial that there be a clearance applied between the outer races of the bearing in the fore-aft direction to ensure all clamping is done through the sleeve 506. A clamping flange 508 that in some embodiments may also acts as a dust shield may be located on the inner race of the lower bearing and a clamp load may be applied via a shaft bolt 507 so that this clamping is applied between both bearing inner raceways and the sleeve via the shaft bolt 507 and clamping flange 508. An upper dust shield 509 may also be applied to further protect the upper bearing from contamination that may occur in this type of environment due to the large fan which is commonly applied. The first bearing assembly, usually the bearing assembly closest to the pulley may be further constrained by a bearing retention system (shown in FIG. 1 as 118) through staking or a retaining clip to ensure there is no forward motion due to thrust forces.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a," "an," and "the" encompass implementations having plural referents, unless the content clearly dictates otherwise. As used in this specification and the appended claims, the term "or" is generally employed in its sense including "and/or" unless the content clearly dictates otherwise.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

What is claimed is:

1. An overhung, low axial runout pulley comprising:
a mounting bracket;
a first bearing assembly seated in the mounting bracket;
a second bearing assembly seated in the mounting bracket;
a sleeve positioned between the first bearing assembly and the second bearing assembly;
a shaft radially positioned between the first bearing assembly, the sleeve, and the second bearing assembly, the shaft having a machined shaft diameter and a machined mounting face, the mounting face being a machined face relative to a machined shaft diameter;
a clamping flange with a shaft bolt, wherein the clamping flange is configured and arranged to axially secure the shaft to the second bearing assembly opposite of a pulley;
a shelf clearance between a second shelf hard stop and the second bearing assembly;
the pulley secured to the shaft, wherein the pulley is secured to the shaft at the machined mounting face utilizing pulley mounting bolts; and further comprising an overhung accessory coupled to the shaft.

2. The overhung, low axial runout pulley of claim 1, wherein at least one of the first bearing assembly and the second bearing assembly is a needle bearing.

3. The overhung, low axial runout pulley of claim 1, wherein at least one of the first bearing assembly and the second bearing assembly is a ball bearing.

4. The overhung, low axial runout pulley of claim 1, further comprising a bearing retention system, wherein the first bearing assembly is retained by the bearing retention system.

5. The overhung, low axial runout pulley of claim 4, wherein the bearing retention system comprises a staked first bearing assembly.

6. The overhung, low axial runout pulley of claim 4, wherein the bearing retention system comprises a retaining ring.

7. The overhung, low axial runout pulley of claim 1, wherein the sleeve contacts an inner race of the first bearing assembly at a sleeve first end and an inner race of the second bearing assembly at a sleeve second end.

8. The overhung, low axial runout pulley of claim 1, wherein the first shelf hard stop contacts an outer race of the first bearing assembly.

9. The overhung, low axial runout pulley of claim 1, wherein the shaft comprises a threaded hub.

10. The overhung, low axial runout pulley of claim 1, wherein at least one of the first bearing assembly and the second bearing assembly is removable.

11. The overhung, low axial runout pulley of claim 1, further comprising an upper dust shield configured to limit contamination of the first bearing assembly.

12. The overhung, low axial runout pulley of claim 1, wherein the clamping flange comprises a lower dust shield configured to limit contamination of the second bearing assembly.

13. The overhung, low axial runout pulley of claim 1, wherein the shaft bolt provides an axial compressive force configured to clamp an inner race of the first bearing assembly, the sleeve, and an inner race of the second bearing assembly so that the inner race of the first bearing assembly, the sleeve, and the inner race of the second bearing assembly rotate simultaneously.

14. The overhung, low axial runout pulley of claim 1 wherein the shaft is rotatably positioned between the first bearing assembly and the second bearing assembly having a radial clearance fit to the first bearing assembly and the second bearing assembly.

15. The overhung, low axial runout pulley of claim 1 wherein the overhung accessory is a fan blade.

16. The overhung, low axial runout pulley of claim 1 wherein the overhung accessory is a propeller.

* * * * *